US010917014B2

(12) United States Patent
Jiang et al.

(10) Patent No.: US 10,917,014 B2
(45) Date of Patent: Feb. 9, 2021

(54) FREE-WHEELING DIODE CONTROL METHOD AND APPARATUS AND POWER SWITCHING APPARATUS

(71) Applicant: Huawei Technologies Co., Ltd., Shenzhen (CN)

(72) Inventors: Chengfeng Jiang, Shenzhen (CN); Hongfeng Liang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/805,092

(22) Filed: Feb. 28, 2020

(65) Prior Publication Data

US 2020/0204077 A1 Jun. 25, 2020

Related U.S. Application Data

(63) Continuation of application No. PCT/CN2018/102736, filed on Aug. 28, 2018.

(30) Foreign Application Priority Data

Sep. 1, 2017 (CN) .......................... 2017 1 0777928

(51) Int. Cl.
*H02M 3/156* (2006.01)
*H02M 3/158* (2006.01)

(52) U.S. Cl.
CPC .................................. *H02M 3/1582* (2013.01)

(58) Field of Classification Search
CPC . H02M 2001/0048; H02M 2001/0051; H02M 2001/0054; H02M 3/156; H02M 3/158; H02M 3/1582; H02M 3/1588
See application file for complete search history.

(56) References Cited

U.S. PATENT DOCUMENTS

| 5,189,601 | A | 2/1993 | Sellers | |
|---|---|---|---|---|
| 8,773,092 | B2 | 7/2014 | Fishelov et al. | |
| 9,602,004 | B2* | 3/2017 | Deng | H02M 3/1582 |
| 9,608,520 | B2* | 3/2017 | Peng | H02M 3/156 |
| 9,973,083 | B1* | 5/2018 | Rose | H02M 3/156 |
| 2005/0285583 | A1* | 12/2005 | Takahashi | H02M 1/4225 323/282 |
| 2009/0284992 | A1* | 11/2009 | Kenly | H02M 3/156 363/21.06 |
| 2013/0241513 | A1* | 9/2013 | Trautmann | H02M 3/1588 323/283 |

(Continued)

FOREIGN PATENT DOCUMENTS

| CN | 102624211 A | 8/2012 |
|---|---|---|
| CN | 103066825 A | 4/2013 |

(Continued)

*Primary Examiner* — Gary L Laxton
(74) *Attorney, Agent, or Firm* — Conley Rose, P.C.

(57) ABSTRACT

A free-wheeling diode control method includes determining whether a sum of a first pulse width value of a free-wheeling diode obtained according to an inductance current law and a third pulse width value of a main control tube meets a first preset condition, obtaining a determining result, and controlling, according to the determining result, conduction of the free-wheeling diode according to the first pulse width value or a second pulse width value of the free-wheeling diode obtained according to a volt-second balance law.

20 Claims, 6 Drawing Sheets

(56) References Cited

U.S. PATENT DOCUMENTS

2015/0180330 A1    6/2015  Ye

FOREIGN PATENT DOCUMENTS

| CN | 103166442 A | 6/2013 |
| CN | 105356739 A | 2/2016 |
| CN | 105874694 A | 8/2016 |
| CN | 107482885 A | 12/2017 |
| WO | 2004006037 A2 | 1/2004 |

* cited by examiner

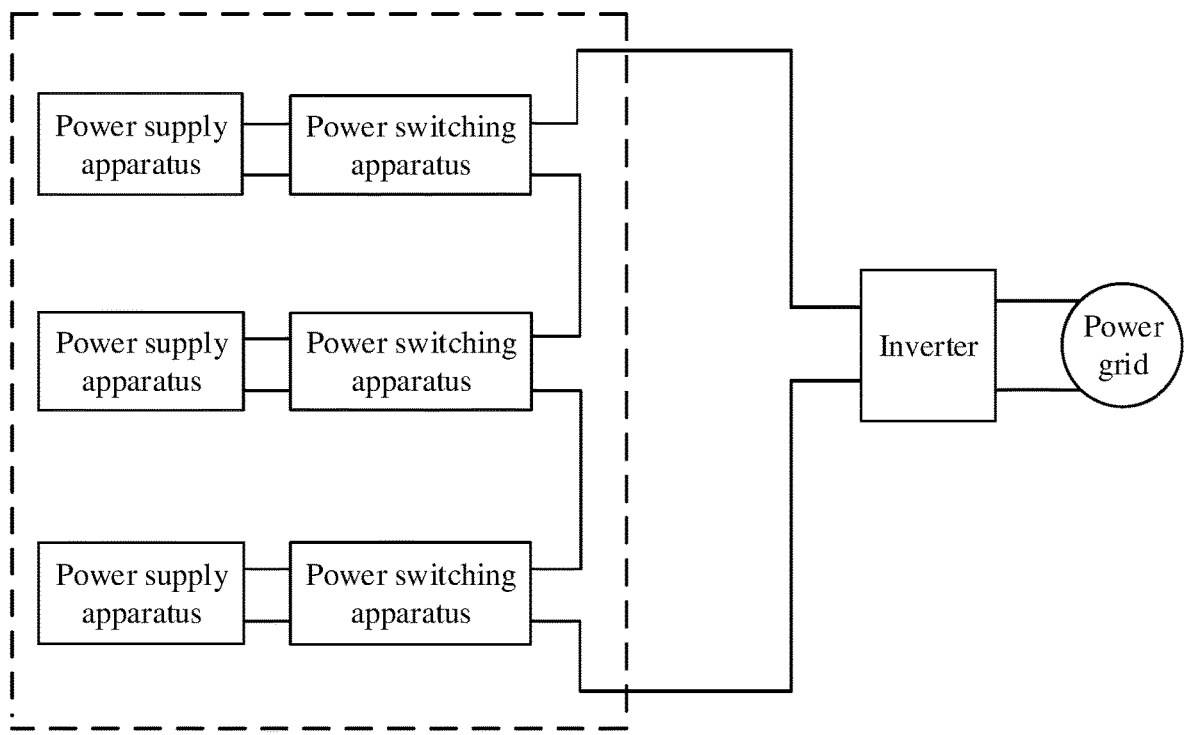

FIG. 1F

Obtain a first pulse width value of a free-wheeling diode in a power switching apparatus according to an inductance current law, and obtain a second pulse width value of the free-wheeling diode according to a volt-second balance law ~ S201

Determine whether a sum of the first pulse width value and a third pulse width value of a main control tube in the power switching apparatus meets a first preset condition, and obtain a determining result ~ S202

Determine, according to the determining result, to control conduction of the free-wheeling diode according to the first pulse width value or the second pulse width value ~ S203

FIG. 2

FREE-WHEELING DIODE CONTROL METHOD AND APPARATUS AND POWER SWITCHING APPARATUS

CROSS-REFERENCE TO RELATED APPLICATIONS

This application is a continuation of International Patent Application No. PCT/CN2018/102736 filed on Aug. 28, 2018, which claims priority to Chinese Patent Application No. 201710777928.4 filed on Sep. 1, 2017. The disclosures of the aforementioned applications are hereby incorporated by reference in their entireties.

TECHNICAL FIELD

This application relates to the field of power supply technologies, and in particular, to a free-wheeling diode control method and apparatus and a power switching apparatus.

BACKGROUND

Generally, energy in a power switching apparatus needs to be transmitted from an input end to an output end, and if the energy in the power switching apparatus is transmitted from the output end to the input end, this brings a risk to a circuit system that includes the power switching apparatus. Therefore, how to control the energy in the power switching apparatus to be always unidirectionally transmitted from the input end to the output end is a difficult problem that needs to be urgently resolved.

In other approaches, the power switching apparatus includes a control apparatus and a power apparatus. The power apparatus includes an inductor, a main control tube, and a corresponding free-wheeling diode. The control apparatus is configured to control conduction of the main control tube in the power apparatus and conduction of the free-wheeling diode. Generally, in a constant-frequency control system, the control apparatus controls conduction of the free-wheeling diode according to a principle that a pulse width of the main control tube is complementary to a pulse width of the free-wheeling diode (that is, a sum of a pulse width value of the main control tube and a pulse width value of the free-wheeling diode is equal to a switching period of the power switching apparatus).

However, in a practical application process, in some scenarios, for example, in a discontinuous current mode (DCM), the sum of the pulse width value of the main control tube and the pulse width value of the free-wheeling diode is less than the switching period of the power switching apparatus. If the control apparatus still controls conduction of the free-wheeling diode according to the principle that the pulse width of the main control tube is complementary to the pulse width of the free-wheeling diode, a negative inductance current appears in the power switching apparatus, that is, the energy in the power switching apparatus is transmitted from the output end to the input end. Consequently, reliability of the circuit system is affected.

SUMMARY

In a free-wheeling diode control method and apparatus and a power switching apparatus that are provided in embodiments of this application, conduction of a free-wheeling diode may be controlled by flexibly using different pulse width values according to different running scenarios of the power switching apparatus such that energy in the power switching apparatus is always unidirectionally transmitted from an input end to an output end. In this way, reliability of a circuit system is ensured.

According to a first aspect, an embodiment of this application provides a free-wheeling diode control method, including obtaining a first pulse width value of a free-wheeling diode in a power switching apparatus according to an inductance current law, and obtaining a second pulse width value of the free-wheeling diode according to a volt-second balance law, determining whether a sum of the first pulse width value and a third pulse width value of a main control tube in the power switching apparatus meets a first preset condition, and obtaining a determining result, and determining, according to the determining result, to control conduction of the free-wheeling diode according to the first pulse width value or the second pulse width value.

According to the free-wheeling diode control method provided in the first aspect, whether the sum of the first pulse width value of the free-wheeling diode in the power switching apparatus obtained according to the inductance current law and the third pulse width value of the main control tube in the power switching apparatus meets the first preset condition is determined, and the determining result is obtained. Further, to control conduction of the free-wheeling diode according to the first pulse width value or the second pulse width value of the free-wheeling diode obtained according to the volt-second balance law is determined according to the determining result such that the power switching apparatus controls conduction of the free-wheeling diode according to the first pulse width value in a continuous current mode (CCM) running scenario and/or the power switching apparatus controls conduction of the free-wheeling diode according to the second pulse width value in a DCM running scenario. It can be seen that, in the free-wheeling diode control method provided in this embodiment of this application, conduction of the free-wheeling diode may be controlled by flexibly using different pulse width values according to different running scenarios of the power switching apparatus such that energy in the power switching apparatus is always unidirectionally transmitted from an input end to an output end (that is, no negative inductance current appears in the power switching apparatus). In this way, reliability of a circuit system is ensured.

In a possible implementation, determining, according to the determining result, to control conduction of the free-wheeling diode according to the first pulse width value or the second pulse width value includes, if the sum of the first pulse width value and the third pulse width value of the main control tube in the power switching apparatus meets the first preset condition, determining whether a sum of the second pulse width value and the third pulse width value meets a second preset condition, and if the sum of the second pulse width value and the third pulse width value meets the second preset condition, controlling conduction of the free-wheeling diode according to the second pulse width value, or if the sum of the second pulse width value and the third pulse width value does not meet the second preset condition, determining whether a quantity of times that the sum of the second pulse width value and the third pulse width value does not meet the second preset condition is less than a preset threshold, and if the quantity of times that the sum of the second pulse width value and the third pulse width value does not meet the second preset condition is less than the preset threshold, controlling conduction of the free-wheeling diode according to the second pulse width value.

In a possible implementation, the method further includes, if the quantity of times that the sum of the second pulse width value and the third pulse width value does not meet the second preset condition is greater than or equal to the preset threshold, controlling conduction of the free-wheeling diode according to the first pulse width value.

In a possible implementation, determining, according to the determining result, to control conduction of the free-wheeling diode according to the first pulse width value or the second pulse width value further includes, if the sum of the first pulse width value and the third pulse width value of the main control tube in the power switching apparatus does not meet the first preset condition, controlling conduction of the free-wheeling diode according to the first pulse width value.

In a possible implementation, controlling conduction of the free-wheeling diode according to the first pulse width value includes, if the first pulse width value is less than or equal to a preset pulse width value, controlling, according to the first pulse width value, a pulse width modulation (PWM) generation apparatus in the power switching apparatus to generate a first PWM wave, where the first PWM wave is used to control the free-wheeling diode.

In a possible implementation, the method further includes, if the first pulse width value is greater than the preset pulse width value, controlling, according to the preset pulse width value, the PWM generation apparatus to generate a second PWM wave, where the second PWM wave is used to control the free-wheeling diode.

In a possible implementation, controlling conduction of the free-wheeling diode according to the second pulse width value includes controlling, according to the second pulse width value, the PWM generation module in the power switching apparatus to generate a third PWM wave, where the third PWM wave is used to control the free-wheeling diode.

In a possible implementation, obtaining a first pulse width value of a free-wheeling diode in a power switching apparatus according to an inductance current law includes determining the first pulse width value according to the inductance current law and based on an inductance value of an inductor in the power switching apparatus, a current of the inductor, and an output voltage of the power switching apparatus.

In a possible implementation, obtaining a second pulse width value of the free-wheeling diode according to a volt-second balance law includes determining the second pulse width value according to the volt-second balance law and based on an input voltage and the output voltage of the power switching apparatus and the third pulse width value of the main control tube.

According to the free-wheeling diode control method provided in the first aspect, the running scenario of the power switching apparatus is determined in a manner of determining whether the sum of the first pulse width value of the free-wheeling diode and the third pulse width value of the main control tube meets the first preset condition, determining whether the sum of the second pulse width value and the third pulse width value meets the second preset condition, and/or determining whether the quantity of times that the sum of the second pulse width value and the third pulse width value does not meet the second preset condition is less than the preset threshold. Further, conduction of the free-wheeling diode may be controlled by flexibly using different pulse width values according to different running scenarios of the power switching apparatus (for example, the power switching apparatus controls conduction of the free-wheeling diode according to the first pulse width value in the CCM running scenario, and/or the power switching apparatus controls conduction of the free-wheeling diode according to the second pulse width value in the DCM running scenario) such that the energy in the power switching apparatus is always unidirectionally transmitted from the input end to the output end (that is, no negative inductance current appears in the power switching apparatus). In this way, the reliability of the circuit system is ensured.

According to a second aspect, an embodiment of this application provides a free-wheeling diode control apparatus, including an obtaining module configured to obtain a first pulse width value of a free-wheeling diode in a power switching apparatus according to an inductance current law, and obtain a second pulse width value of the free-wheeling diode according to a volt-second balance law, a determining module configured to determine whether a sum of the first pulse width value and a third pulse width value of a main control tube in the power switching apparatus meets a first preset condition, and obtain a determining result, and a control module configured to determine, according to the determining result, to control conduction of the free-wheeling diode according to the first pulse width value or the second pulse width value.

In a possible implementation, the control module is further configured to, if the sum of the first pulse width value and the third pulse width value of the main control tube in the power switching apparatus meets the first preset condition, determine whether a sum of the second pulse width value and the third pulse width value meets a second preset condition, and if the sum of the second pulse width value and the third pulse width value meets the second preset condition, control conduction of the free-wheeling diode according to the second pulse width value, or if the sum of the second pulse width value and the third pulse width value does not meet the second preset condition, determine whether a quantity of times that the sum of the second pulse width value and the third pulse width value does not meet the second preset condition is less than a preset threshold, and if the quantity of times that the sum of the second pulse width value and the third pulse width value does not meet the second preset condition is less than the preset threshold, control conduction of the free-wheeling diode according to the second pulse width value.

In a possible implementation, the control module is further configured to, if the quantity of times that the sum of the second pulse width value and the third pulse width value does not meet the second preset condition is greater than or equal to the preset threshold, control conduction of the free-wheeling diode according to the first pulse width value.

In a possible implementation, the control module is further configured to, if the sum of the first pulse width value and the third pulse width value of the main control tube in the power switching apparatus does not meet the first preset condition, control conduction of the free-wheeling diode according to the first pulse width value.

In a possible implementation, the control module is further configured to, if the first pulse width value is less than or equal to a preset pulse width value, control, according to the first pulse width value, a PWM generation apparatus in the power switching apparatus to generate a first PWM wave, where the first PWM wave is used to control the free-wheeling diode.

In a possible implementation, the control module is further configured to, if the first pulse width value is greater than the preset pulse width value, control, according to the preset pulse width value, the PWM generation apparatus to generate a second PWM wave, where the second PWM wave is used to control the free-wheeling diode.

In a possible implementation, the control module is further configured to control, according to the second pulse width value, the PWM generation module in the power switching apparatus to generate a third PWM wave, where the third PWM wave is used to control the free-wheeling diode.

In a possible implementation, the obtaining module includes a first determining unit configured to determine the first pulse width value according to the inductance current law and based on an inductance value of an inductor in the power switching apparatus, a current of the inductor, and an output voltage of the power switching apparatus.

In a possible implementation, the obtaining module includes a second determining unit configured to determine the second pulse width value according to the volt-second balance law and based on an input voltage and the output voltage of the power switching apparatus and the third pulse width value of the main control tube.

For beneficial effects of the implementations in the second aspect, refer to the beneficial effects brought by the corresponding implementations in the first aspect, and details are not described herein.

According to a third aspect, an embodiment of this application provides a power switching apparatus, including the free-wheeling diode control apparatus described in any possible implementation in the second aspect.

For beneficial effects of implementations in the third aspect, refer to the beneficial effects brought by the corresponding implementations in the first aspect, and details are not described herein.

According to a fourth aspect, an embodiment of this application provides a power switching apparatus, including a memory and a processor.

The memory is configured to store a program instruction, and the processor is configured to call the program instruction in the memory to perform the method described in any possible implementation in the first aspect.

For beneficial effects of implementations in the fourth aspect, refer to the beneficial effects brought by the corresponding implementations in the first aspect, and details are not described herein.

A fifth aspect of this application provides a power switching apparatus, including at least one processing element (or chip) configured to perform the method in the first aspect.

A sixth aspect of this application provides a computer program product including an instruction, and when the computer program product runs on a computer, the computer is enabled to perform the method in the first aspect.

A seventh aspect of this application provides a computer readable storage medium. The computer readable storage medium stores an instruction. When the instruction is run on a computer, the computer is enabled to perform the method in the first aspect.

BRIEF DESCRIPTION OF DRAWINGS

FIG. 1F is a schematic diagram of a serial connection scenario according to an embodiment of this application;

FIG. 2 is a schematic flowchart of a free-wheeling diode control method according to an embodiment of this application;

DESCRIPTION OF EMBODIMENTS

First, a power switching apparatus and some terms in embodiments of this application are explained.

Figure 1A:
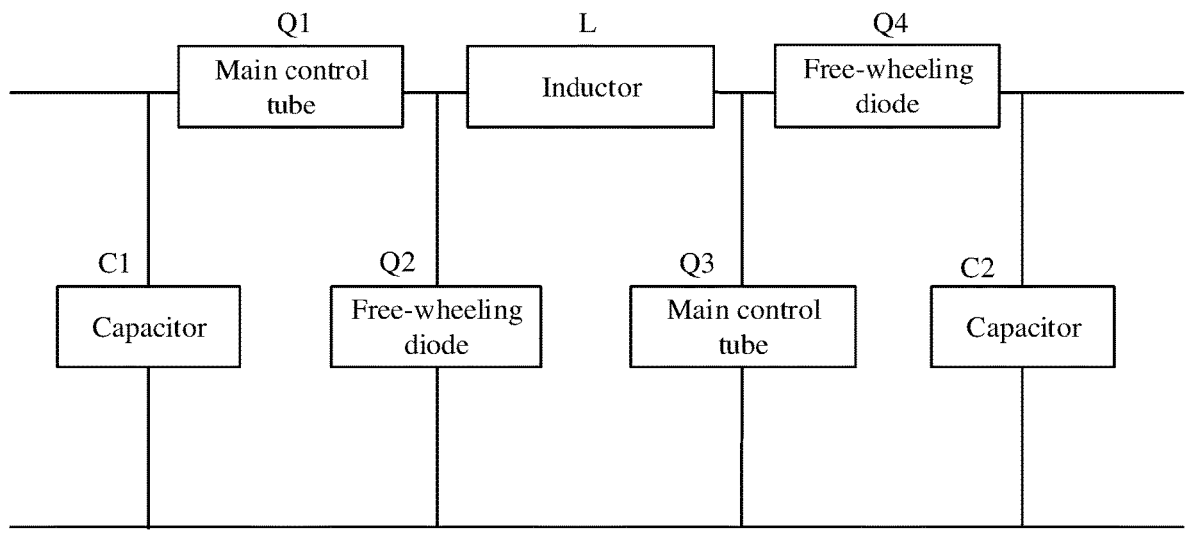
FIG. 1A is a schematic diagram of a circuit structure of a power apparatus in a power switching apparatus according to an embodiment of this application.
Figure 1B:
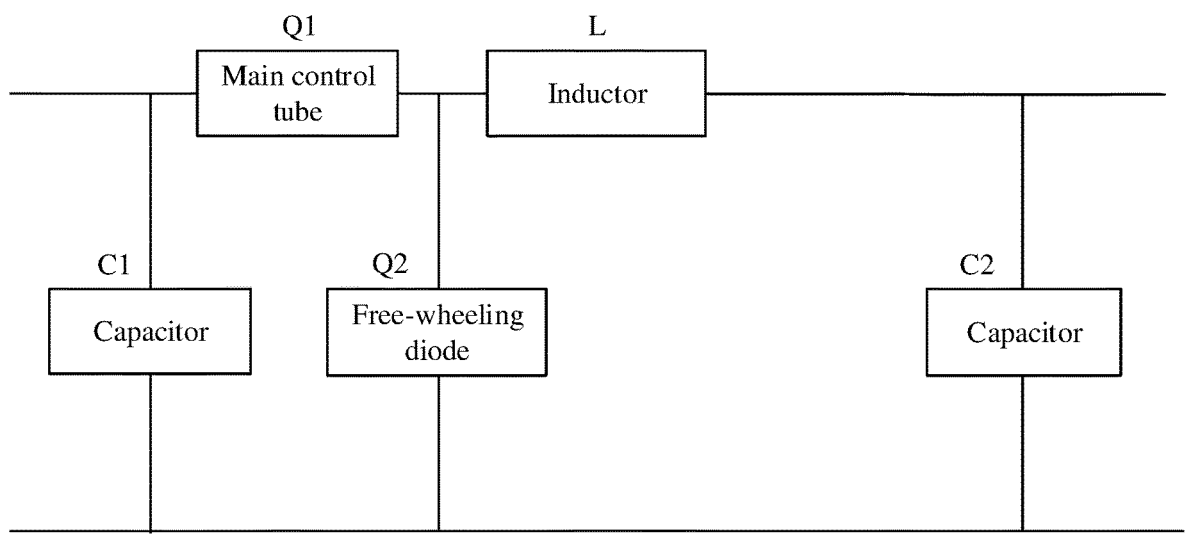
FIG. 1B is a schematic diagram of a circuit structure of a power apparatus in a power switching apparatus according to an embodiment of this application.
Figure 1C:
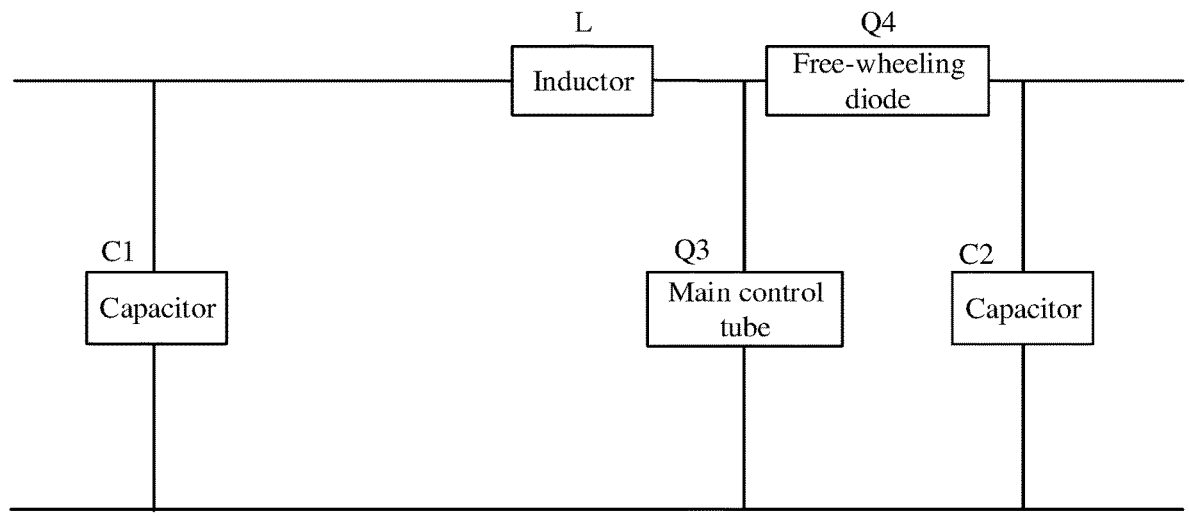
FIG. 1C is a schematic diagram of a circuit structure of a power apparatus in a power switching apparatus according to an embodiment of this application.
Figure 1D:
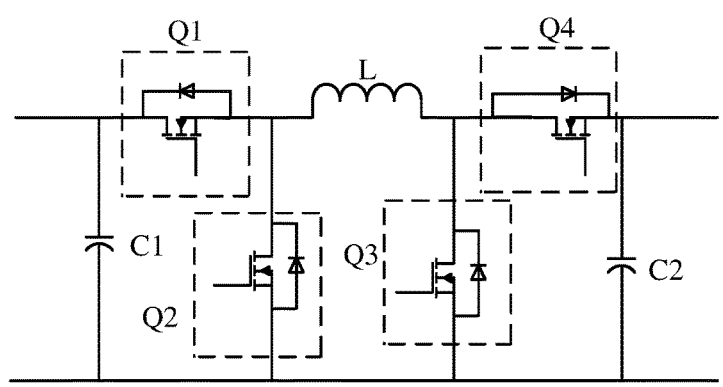
FIG. 1D is a schematic diagram of a circuit structure of a power apparatus in a power switching apparatus according to an embodiment of this application.

FIG. 1A is a schematic diagram 1 of a circuit structure of a power apparatus in a power switching apparatus according to an embodiment of this application. FIG. 1B is a schematic diagram 2 of a circuit structure of a power apparatus in a power switching apparatus according to an embodiment of this application. FIG. 1C is a schematic diagram 3 of a circuit structure of a power apparatus in a power switching apparatus according to an embodiment of this application. FIG. 1D is a schematic diagram 4 of a circuit structure of a power apparatus in a power switching apparatus according to an embodiment of this application. Optionally, in the embodiments of this application, an example in which the power apparatus includes a buck-boost circuit is used for description. Certainly, the power apparatus may alternatively include another type of circuit. The embodiments of this application impose no limitation thereto. As shown in FIG. 1A, the power apparatus includes an input capacitor C1, a main control tube Q1, a free-wheeling diode Q2, an inductor L, a main control tube Q3, a free-wheeling diode Q4, and an output capacitor C2. Optionally, the inductor L may be a single inductor, or may be obtained by coupling a plurality of inductors. Optionally, the main control tube Q1, the free-wheeling diode Q2, the main control tube Q3, and/or the free-wheeling diode Q4 are/is a controllable tube, such as a metal-oxide semiconductor (MOS) field effect transistor or an insulated gate bipolar transistor (IGBT). Optionally, control electrodes (for example, if the MOS transistor is used, the control electrode is a gate electrode, and if the IGBT is used, the control electrode is a gate electrode) of the main control tube Q1, the free-wheeling diode Q2, the main control tube Q3, and the free-wheeling diode Q4 are respectively connected to corresponding PWM generation apparatuses. Optionally, the circuit structure shown in FIG. 1A may be implemented using the circuit structure shown in FIG. 1D. Certainly, the circuit structure shown in FIG. 1A may be alternatively implemented using another existing or future circuit structure. The embodiments of this application impose no limitation thereto.

It may be understood that FIG. 1A or FIG. 1D only shows a simplified design in the example in which the power apparatus includes the buck-boost circuit. Optionally, in another implementation, the power apparatus may include another circuit component. The embodiments of this application impose no limitation thereto.

Optionally, the power apparatus is in a buck mode or a boost mode at a specific moment. (1) In the buck mode (the main control tube Q3 is always in a disconnected state and the free-wheeling diode Q4 is always in a conductive state, and this is equivalent to switching from the buck-boost circuit to a buck circuit, as shown in FIG. 1B), a control apparatus of the power switching apparatus is configured to control conduction or disconnection of the main control tube Q1 and the free-wheeling diode Q2. Optionally, a control apparatus (namely a control apparatus of the main control tube) controls conduction or disconnection of the main control tube Q1 by controlling a PWM generation apparatus corresponding to the main control tube Q1 (namely a PWM generation apparatus connected to a control electrode of the main control tube Q1) to generate a corresponding PWM wave. Optionally, a control apparatus (namely a corresponding free-wheeling diode control apparatus in this application) controls conduction or disconnection of the free-wheeling diode Q2 by controlling a PWM generation apparatus corresponding to the free-wheeling diode Q2 (namely a PWM generation apparatus connected to a control electrode of the free-wheeling diode Q2) to generate a corresponding PWM wave.

(2) In the boost mode (the main control tube Q1 is always in a conductive state and the free-wheeling diode Q2 is always in a disconnected state, and this is equivalent to switching from the buck-boost circuit to a boost circuit, as shown in FIG. 1C), a control apparatus of the power switching apparatus is configured to control conduction or disconnection of the main control tube Q3 and the free-wheeling diode Q4. Optionally, a control apparatus (namely a control apparatus of the main control tube) controls conduction or disconnection of the main control tube Q3 by controlling a PWM generation apparatus corresponding to the main control tube Q3 (namely a PWM generation apparatus connected to a control electrode of the main control tube Q3) to generate a corresponding PWM wave. Optionally, a control apparatus (namely a corresponding free-wheeling diode control apparatus in this application) controls conduction or disconnection of the free-wheeling diode Q4 by controlling a PWM generation apparatus corresponding to the free-wheeling diode Q4 (namely a PWM generation apparatus connected to a control electrode of the free-wheeling diode Q4) to generate a corresponding PWM wave.

Optionally, for a specific implementation in which the control apparatus controls conduction or disconnection of the main control tube by controlling the PWM generation apparatus corresponding to the main control tube (namely the PWM generation apparatus connected to the control electrode of the main control tube) to generate the corresponding PWM wave, refer to the other approaches implementation of controlling the main control tube. The embodiments of this application impose no limitation thereto.

Certainly, the buck-boost circuit may be alternatively implemented using a variant of the circuit shown in FIG. 1A or another circuit form. The embodiments of this application impose no limitation thereto.

The PWM generation apparatus in this application may be integrated into a corresponding control apparatus or independent of the corresponding control apparatus (optionally, the control apparatus includes the control apparatus of the main control tube or the free-wheeling diode control apparatus). The embodiments of this application impose no limitation thereto.

The power switching apparatus in this application may be widely used in industrial automation, a military device, a scientific research device, light emitting diode (LED) lighting, an industrial control device, a communications device, an electric power device, an instrument or a meter, a medical device, semiconductor refrigeration and heating, an air purifier, an electronic refrigerator, a liquid crystal display, an LED lamp, a communications device, an audio-visual product, security monitoring, an LED lamp pocket, a computer case, a digital product and instrument, and the like (that is, widely used in almost all electronic devices).

Figure 1E:
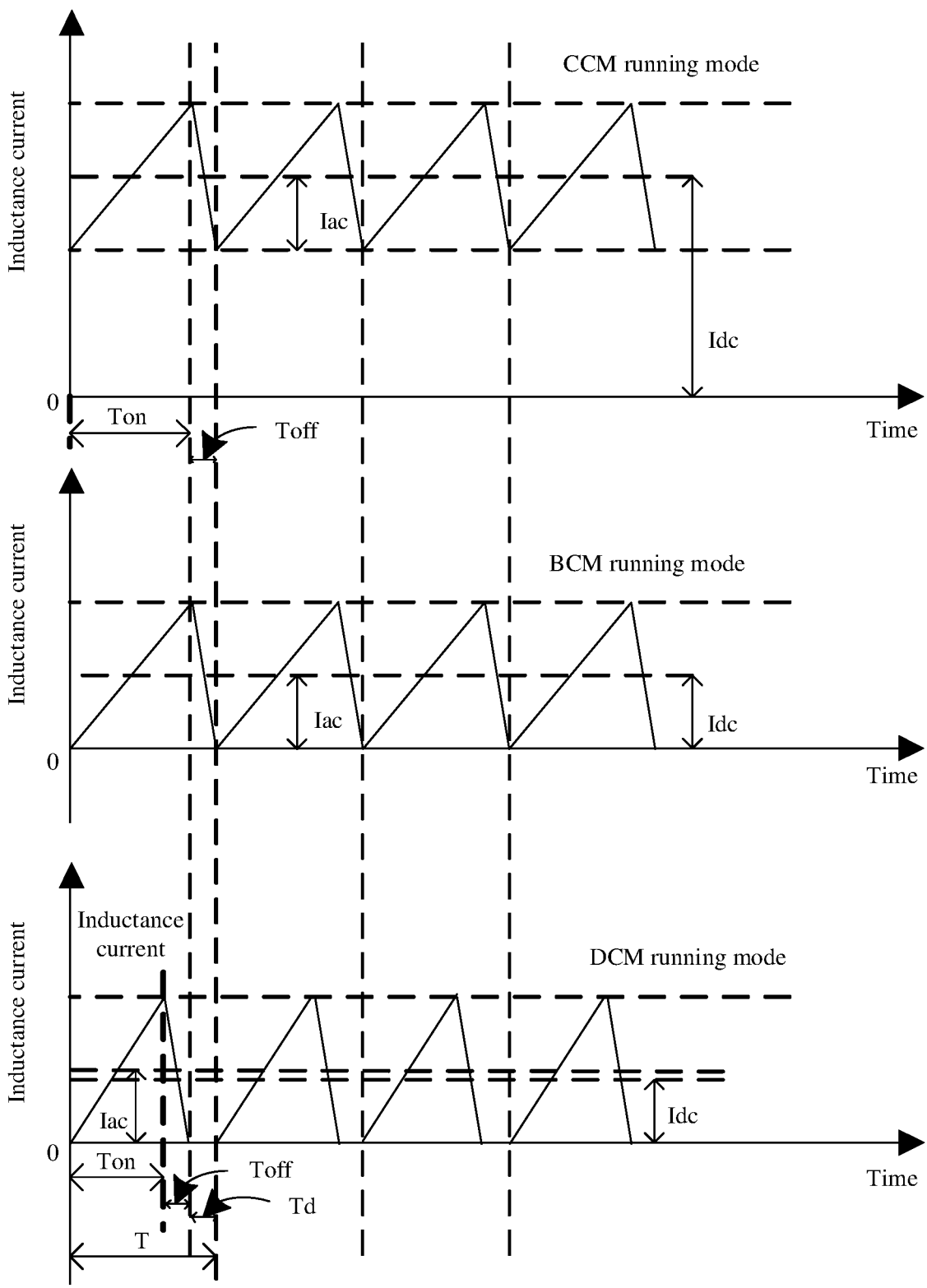
FIG. 1E is a schematic waveform diagram of an inductance current in different running modes according to an embodiment of this application.

A CCM in the embodiments of this application is that an inductance current never becomes 0 in a switching period of the power switching apparatus, as shown in FIG. 1E (FIG. 1E is a schematic waveform diagram of an inductance current in different running modes according to an embodiment of this application). In the CCM running mode, the switching period T of the power switching apparatus=a pulse width value Ton of the main control tube in the power switching apparatus+a pulse width value Toff of the free-wheeling diode.

A boundary current mode (BCM) in the embodiments of this application is that the control apparatus (namely the control apparatus of the main control tube) monitors an inductance current and immediately controls conduction of the main control tube once the inductance current is detected to be 0, as shown in FIG. 1E. In the BCM running mode, the switching period T of the power switching apparatus=a pulse width value Ton of the main control tube in the power switching apparatus+a pulse width value Toff of the free-wheeling diode.

A DCM in the embodiments of this application is that an inductance current inevitably becomes 0 in a switching period of the power switching apparatus (as shown in FIG. 1E, there is a DCM dead time Td). In the DCM running mode, the switching period T of the power switching apparatus=a pulse width value Ton of the main control tube in the power switching apparatus+a pulse width value Toff of the free-wheeling diode+the DCM dead time Td.

Optionally, in FIG. 1E, a vertical coordinate is an inductance current in a unit of ampere, and a horizontal coordinate is a time in a unit of second.

Optionally, in FIG. 1E in the embodiments of this application, a falling edge dead time of the main control tube and a rising edge dead time of the main control tube are not shown (generally, the falling edge dead time of the main control tube and the rising edge dead time of the main control tube are very small preset values, and are almost negligible).

In the embodiments of this application, the free-wheeling diode control apparatus may obtain in advance parameters such as the switching period T of the power switching apparatus, the pulse width value Ton of the main control tube in the power switching apparatus, an inductance value of the inductor, the inductance current, and an input voltage and an output voltage of the power switching apparatus. A specific manner for obtaining these parameters may be an existing or future obtaining manner. The embodiments of this application impose no limitation on the obtaining manner.

A pulse width of the free-wheeling diode in the embodiments of this application is that a pulse width corresponding to a PWM wave that is generated by the PWM generation apparatus in the power switching apparatus to control the free-wheeling diode.

A pulse width of the main control tube in the embodiments of this application is that a pulse width corresponding to a PWM wave that is generated by the PWM generation apparatus in the power switching apparatus to control the main control tube.

Numbers "first", "second", "third", and the like in the embodiments of this application are intended to distinguish between similar objects, but do not indicate a specific order or sequence, and shall not constitute any limitation on the embodiments of this application.

Generally, energy in the power switching apparatus needs to be transmitted from an input end to an output end, and if the energy in the power switching apparatus is transmitted from the output end to the input end, this brings a risk to a circuit system that includes the power switching apparatus. Especially in some scenarios with high requirements (for example, a serial connection scenario of power switching apparatuses), as shown in FIG. 1F (FIG. 1F is a schematic diagram of a serial connection scenario according to an embodiment of this application), when input of a power switching apparatus becomes 0 (that is, output of a power supply apparatus corresponding to the power switching apparatus becomes 0, optionally, the power supply apparatus may be a photovoltaic module, and certainly may be alternatively another type of power supply apparatus, the embodiments of this application impose no limitation thereto), an output voltage of the power switching apparatus is rapidly transferred to an output end of another power switching apparatus. This may cause a voltage of an output end of the other power switching apparatus to rapidly rise to an uncontrollable state. In this case, if energy in the other power switching apparatus is transmitted from the output end to an input end, the other power switching apparatus is inevitably damaged. Therefore, how to control the energy in the power switching apparatus to be always unidirectionally transmitted from the input end to the output end is a difficult problem that needs to be urgently resolved.

Generally, in a constant-frequency control system, the control apparatus (namely the free-wheeling diode control apparatus) controls conduction of the free-wheeling diode according to a principle that the pulse width of the main control tube is complementary to the pulse width of the free-wheeling diode (that is, a sum of the pulse width value of the main control tube and the pulse width value of the free-wheeling diode is equal to the switching period of the power switching apparatus). However, in a practical application process, in some scenarios (for example, in the DCM), the sum of the pulse width value (for example, Ton in FIG. 1E) of the main control tube and the pulse width value (for example, Toff in FIG. 1E) of the free-wheeling diode is less than the switching period (for example, T in FIG. 1E) of the power switching apparatus. If the control apparatus still controls conduction of the free-wheeling diode according to the principle that the pulse width of the main control tube is complementary to the pulse width of the free-wheeling diode, a negative inductance current appears in the power switching apparatus, that is, the energy in the power switching apparatus is transmitted from the output end to the input end. Consequently, reliability of the circuit system is affected.

In a free-wheeling diode control method and apparatus and the power switching apparatus that are provided in the embodiments of this application, conduction of the free-wheeling diode may be controlled by flexibly using different pulse width values according to different running scenarios of the power switching apparatus (for example, the power switching apparatus controls conduction of the free-wheeling diode according to a first pulse width value in the CCM running scenario, and/or the power switching apparatus controls conduction of the free-wheeling diode according to a second pulse width value in the DCM running scenario) such that the energy in the power switching apparatus is always unidirectionally transmitted from the input end to the output end (that is, no negative inductance current appears in the power switching apparatus). In this way, the reliability of the circuit system is ensured.

The following uses specific embodiments to describe in detail the technical solutions in this application and how the foregoing technical problem is resolved in the technical solutions in this application. The following several specific embodiments may be combined with each other, and a same or similar concept or process may not be described repeatedly in some embodiments.

FIG. 2 is a schematic flowchart of a free-wheeling diode control method according to an embodiment of this application. This embodiment may be performed by a free-wheeling diode control apparatus disposed in a power switching apparatus, and the apparatus may be implemented using software and/or hardware. As shown in FIG. 2, the method in this embodiment of this application may include the following steps.

Step S201: Obtain a first pulse width value of a free-wheeling diode in a power switching apparatus according to an inductance current law, and obtain a second pulse width value of the free-wheeling diode according to a volt-second balance law.

In this embodiment, the free-wheeling diode control apparatus obtains the first pulse width value of the free-wheeling diode (for example, a free-wheeling diode Q2 shown in FIG. 1A and/or FIG. 1B when a buck-boost circuit is in a buck mode, or a free-wheeling diode Q4 shown in FIG. 1A and/or FIG. 1C when a buck-boost circuit is in a boost mode) in the power switching apparatus according to the inductance current law, and obtains the second pulse width value of the free-wheeling diode according to the volt-second balance law. Certainly, if a power apparatus includes another type of circuit, the free-wheeling diode control apparatus obtains a first pulse width value of a free-wheeling diode in the corresponding power apparatus according to the inductance current law, and obtains a second pulse width value of the free-wheeling diode according to the volt-second balance law (for ease of understanding, a power apparatus shown in FIG. 1A is used as an example for description in this embodiment). This embodiment of this application imposes no limitation thereto.

Optionally, the free-wheeling diode control apparatus determines the first pulse width value according to the inductance current law and based on an inductance value of an inductor in the power switching apparatus, a current of the inductor (referred to as an inductance current in the following content), and an output voltage of the power switching apparatus. Certainly, the free-wheeling diode control apparatus may alternatively determine the first pulse width value according to the inductance current law and based on another equivalent parameter of each parameter of the inductance value of the inductor in the power switching apparatus, the current of the inductor, and the output voltage of the power switching apparatus or another parameter. This embodiment of this application imposes no limitation thereto.

Optionally, the free-wheeling diode control apparatus may determine the first pulse width value according to the inductance current law and based on the inductance value of the inductor in the power switching apparatus, the current of the inductor, and the output voltage of the power switching apparatus in at least the following implementations.

First implementation: When the buck-boost circuit is in the buck mode (for example, equivalent to that shown in FIG. 1B), the free-wheeling diode control apparatus determines a first pulse width value Toff1 using a formula $$Toff1 = \frac{2Lv}{Vo}IL \quad \text{(formula 1)}$$

and based on an inductance value Lv of an inductor L in the power switching apparatus, a current IL of the inductor, and an output voltage Vo of the power switching apparatus, where the output voltage Vo of the power switching apparatus represents a voltage at both ends of an output capacitor C2. Certainly, based on the inductance value Lv of the inductor L in the power switching apparatus, the current IL of the inductor, and the output voltage Vo of the power switching apparatus, the free-wheeling diode control apparatus may alternatively determine the first pulse width value Toff1 using a variant of the formula 1 or another formula. This embodiment of this application imposes no limitation thereto.

Second implementation: When the buck-boost circuit is in the boost mode (for example, equivalent to that shown in FIG. 1C), the free-wheeling diode control apparatus determines a first pulse width value Toff1 using a formula $$Toff1 = \frac{2Lv}{Vo - Vin}IL \quad \text{(formula 2)}$$

and based on an inductance value Lv of an inductor L in the power switching apparatus, a current IL of the inductor, an output voltage Vo of the power switching apparatus, and an input voltage Vin of the power switching apparatus, where the output voltage Vo of the power switching apparatus represents a voltage at both ends of an output capacitor C2, and the input voltage Vin of the power switching apparatus represents a voltage at both ends of an input capacitor C1. Certainly, based on the inductance value Lv of the inductor L in the power switching apparatus, the current IL of the inductor, the output voltage Vo of the power switching apparatus, and the input voltage Vin of the power switching apparatus, the free-wheeling diode control apparatus may alternatively determine the first pulse width value Toff1 using a variant of the formula 2 or another formula. This embodiment of this application imposes no limitation thereto.

Certainly, based on the inductance value of the inductor in the power switching apparatus, the current of the inductor, and the output voltage of the power switching apparatus, the free-wheeling diode control apparatus may alternatively determine the first pulse width value according to the inductance current law in another implementation. This embodiment of this application imposes no limitation thereto.

In conclusion, when the free-wheeling diode control apparatus obtains the first pulse width value of the free-wheeling diode in the power switching apparatus according to the inductance current law, the used current IL of the inductor is usually an average inductance current value Idc. The average inductance current value Idc is generally not equal to an alternating current component Iac of the inductance current (for example, in FIG. 1E, Idc>Iac in a CCM scenario, and Idc<Iac in a DCM scenario). Therefore, in the CCM scenario, the first pulse width value of the free-wheeling diode obtained according to the inductance current law and based on the average inductance current value Idc is greater than an actual pulse width value required by the free-wheeling diode, and in the DCM scenario, the first pulse width value of the free-wheeling diode obtained according to the inductance current law and based on the average inductance current value Idc is less than the actual pulse width value required by the free-wheeling diode. In this way, the first pulse width value of the free-wheeling diode obtained according to the inductance current law may ensure that no negative inductance current appears in the power switching apparatus. In comparison, the second pulse width value of the free-wheeling diode obtained by the free-wheeling diode control apparatus according to the volt-second balance law is closer to the actual pulse width value of the free-wheeling diode, and the two may be considered to be equal.

Optionally, the free-wheeling diode control apparatus determines the second pulse width value according to the volt-second balance law and based on the input voltage and the output voltage of the power switching apparatus and a third pulse width value of a main control tube. Certainly, the free-wheeling diode control apparatus determines the second pulse width value according to the volt-second balance law and based on another equivalent parameter of each parameter of the input voltage and the output voltage of the power switching apparatus and the third pulse width value of the main control tube or another parameter. This embodiment of this application imposes no limitation thereto.

Optionally, the second pulse width value may be determined according to the volt-second balance law and based on the input voltage and the output voltage of the power switching apparatus and the third pulse width value of the main control tube in at least the following implementations.

First implementation: When the buck-boost circuit is in the buck mode (for example, equivalent to that shown in FIG. 1B), the free-wheeling diode control apparatus determines a second pulse width value Toff2 using a formula $$Toff2 = \frac{Vin - Vo}{Vo}Ton \quad \text{(formula 3)}$$

and based on the input voltage Vin and the output voltage Vo of the power switching apparatus and a third pulse width value Ton of the main control tube, where the output voltage Vo of the power switching apparatus represents the voltage at both ends of the output capacitor C2, and the input voltage Vin of the power switching apparatus represents the voltage at both ends of the input capacitor C1. Certainly, based on the input voltage Vin and the output voltage Vo of the power switching apparatus and the third pulse width value Ton of the main control tube, the free-wheeling diode control apparatus may alternatively determine the second pulse width value Toff2 using a variant of the formula 3 or another formula. This embodiment of this application imposes no limitation thereto.

Second implementation: When the buck-boost circuit is in the boost mode (for example, equivalent to that shown in FIG. 1C), the free-wheeling diode control apparatus determines a second pulse width value Toff2 using a formula $$Toff2 = \frac{Vin}{Vo - Vin}Ton \quad \text{(formula 4)}$$

and based on the input voltage Vin and the output voltage Vo of the power switching apparatus and a third pulse width value Ton of the main control tube, where the output voltage Vo of the power switching apparatus represents the voltage at both ends of the output capacitor C2, and the input voltage Vin of the power switching apparatus represents the voltage at both ends of the input capacitor C1. Certainly, based on the input voltage Vin and the output voltage Vo of the power switching apparatus and the third pulse width value Ton of the main control tube, the free-wheeling diode control apparatus may alternatively determine the second pulse width value Toff2 using a variant of the formula 4 or another formula. This embodiment of this application imposes no limitation thereto.

Certainly, based on the input voltage and the output voltage of the power switching apparatus and the third pulse width value of the main control tube, the free-wheeling diode control apparatus may alternatively determine the second pulse width value according to the volt-second balance law in another implementation. This embodiment of this application imposes no limitation thereto.

Step S202: Determine whether a sum of the first pulse width value and the third pulse width value of the main control tube in the power switching apparatus meets a first preset condition, and obtain a determining result.

In this embodiment, the free-wheeling diode control apparatus determines a running scenario of the power switching apparatus, for example, the DCM scenario or a non-DCM scenario (namely the CCM scenario or a BCM scenario), by determining whether the sum of the first pulse width value (namely the pulse width value of the free-wheeling diode obtained according to the inductance current law) and the third pulse width value of the main control tube in the power switching apparatus meets the first preset condition.

Optionally, the free-wheeling diode control apparatus may directly determine whether the sum of the first pulse width value and the third pulse width value of the main control tube in the power switching apparatus is less than or equal to a first preset pulse width value, where the first preset condition includes less than or equal to the first preset pulse width value. Optionally, the first preset pulse width value may be a switching period of the power switching apparatus multiplied by a first preset coefficient (for example, 0.8). Certainly, the first preset coefficient may be alternatively another value. This embodiment of this application imposes no limitation thereto. (1) If the sum of the first pulse width value and the third pulse width value of the main control tube in the power switching apparatus is less than or equal to the first preset pulse width value (that is, the determining result includes the sum of the first pulse width value and the third pulse width value of the main control tube in the power switching apparatus meets the first preset condition), the power switching apparatus is determined to be in the DCM running scenario. (2) If the sum of the first pulse width value and the third pulse width value of the main control tube in the power switching apparatus is greater than the first preset pulse width value (that is, the determining result includes the sum of the first pulse width value and the third pulse width value of the main control tube in the power switching apparatus does not meet the first preset condition), the power switching apparatus is determined to be in the non-DCM running scenario.

Optionally, the free-wheeling diode control apparatus may alternatively determine the running scenario of the power switching apparatus in another equivalent manner that is a variant of "determining whether the sum of the first pulse width value and the third pulse width value of the main control tube in the power switching apparatus meets the first preset condition". For example, the free-wheeling diode control apparatus may alternatively obtain a first dead time of the power switching apparatus (where the first dead time of the power switching apparatus=the switching period of the power switching apparatus−the sum of the first pulse width value and the third pulse width value) according to the sum of the first pulse width value and the third pulse width value. Further, the free-wheeling diode control apparatus determines the running scenario of the power switching apparatus by determining whether the first dead time of the power switching apparatus meets a third preset condition. Optionally, the third preset condition may include greater than or equal to a first preset dead time. Optionally, the first preset dead time may be the switching period of the power switching apparatus multiplied by a second preset coefficient (optionally, a sum of the first preset coefficient and the second preset coefficient is 1, and for example, the second preset coefficient may be 0.2). Certainly, if the first preset coefficient is another value, the second preset coefficient may be alternatively another value accordingly. This embodiment of this application imposes no limitation thereto. (1) If the first dead time of the power switching apparatus is greater than or equal to the first preset dead time (that is, the first dead time of the power switching apparatus meets the third preset condition, equivalent to that the determining result includes the sum of the first pulse width value and the third pulse width value of the main control tube in the power switching apparatus meets the first preset condition), the power switching apparatus is determined to be in the DCM running scenario. (2) If the first dead time of the power switching apparatus is less than the first preset dead time (that is, the first dead time of the power switching apparatus does not meet the third preset condition, equivalent to that the determining result includes the sum of the first pulse width value and the third pulse width value of the main control tube in the power switching apparatus does not meet the first preset condition), the power switching apparatus is determined to be in the non-DCM running scenario.

Optionally, the free-wheeling diode control apparatus may alternatively use another implementation to determine whether the sum of the first pulse width value and the third pulse width value of the main control tube in the power switching apparatus meets the first preset condition. This embodiment of this application imposes no limitation thereto.

Step S203: Determine, according to the determining result, to control conduction of the free-wheeling diode according to the first pulse width value or the second pulse width value.

In this embodiment, the free-wheeling diode control apparatus determines, according to the determining result (including the sum of the first pulse width value and the third pulse width value of the main control tube in the power switching apparatus meets the first preset condition, or the sum of the first pulse width value and the third pulse width value of the main control tube in the power switching apparatus does not meet the first preset condition), whether to control conduction of the free-wheeling diode according to the first pulse width value (namely the pulse width value of the free-wheeling diode obtained according to the inductance current law in step S202) or control conduction of the free-wheeling diode according to the second pulse width value (namely the pulse width value of the free-wheeling diode obtained according to the volt-second balance law in step S202) such that the power switching apparatus controls conduction of the free-wheeling diode according to the first pulse width value in the CCM running scenario and/or the power switching apparatus controls conduction of the free-wheeling diode according to the second pulse width value in the DCM running scenario.

Optionally, an example in which the power apparatus in the power switching apparatus includes a circuit structure shown in FIG. 1A is used. If the power apparatus is in the buck mode, the first pulse width value may be the pulse width value determined according to the formula 1 in step S202, or certainly may be a pulse width value determined according to a variant of the formula 1 or another formula. This embodiment of this application imposes no limitation thereto. The second pulse width value may be the pulse width value determined according to the formula 3 in step S202, or certainly may be a pulse width value determined according to a variant of the formula 3 or another formula. This embodiment of this application imposes no limitation thereto. If the power apparatus is in the boost mode, the first pulse width value may be the pulse width value determined according to the formula 2 in step S202, or certainly may be a pulse width value determined according to a variant of the formula 2 or another formula. This embodiment of this application imposes no limitation thereto. The second pulse width value may be the pulse width value determined according to the formula 4 in step S202, or certainly may be a pulse width value determined according to a variant of the formula 4 or another formula. This embodiment of this application imposes no limitation thereto.

Optionally, if the sum of the first pulse width value and the third pulse width value of the main control tube in the power switching apparatus meets the first preset condition, whether a sum of the second pulse width value and the third pulse width value meets a second preset condition is determined, and if the sum of the second pulse width value and the third pulse width value meets the second preset condition, conduction of the free-wheeling diode is controlled according to the second pulse width value, or if the sum of the second pulse width value and the third pulse width value does not meet the second preset condition, whether a quantity of times that the sum of the second pulse width value and the third pulse width value does not meet the second preset condition is less than a preset threshold is determined, and if the quantity of times that the sum of the second pulse width value and the third pulse width value does not meet the second preset condition is less than the preset threshold, conduction of the free-wheeling diode is controlled according to the second pulse width value.

In this embodiment, if the sum of the first pulse width value (namely the pulse width value of the free-wheeling diode obtained according to the inductance current law) and the third pulse width value of the main control tube in the power switching apparatus meets the first preset condition, and the free-wheeling diode control apparatus determines that the power switching apparatus is in the DCM running scenario (considering that the first pulse width value of the free-wheeling diode obtained according to the inductance current law may ensure that no negative inductance current appears in the power switching apparatus, that is, that the inductance current quits a negative direction is ensured), whether the sum of the second pulse width value (namely the pulse width value of the free-wheeling diode obtained according to the volt-second balance law) and the third pulse width value meets the second preset condition is determined. Optionally, if the sum of the first pulse width value and the third pulse width value of the main control tube in the power switching apparatus does not meet the first preset condition, conduction of the free-wheeling diode is controlled according to the first pulse width value.

Optionally, the free-wheeling diode control apparatus may directly determine whether the sum of the second pulse width value and the third pulse width value is less than or equal to a second preset pulse width value, where the second preset condition includes less than or equal to the second preset pulse width value. Optionally, the second preset pulse width value may be the switching period of the power switching apparatus multiplied by a third preset coefficient (for example, 0.9). Certainly, the third preset coefficient may be alternatively another value (the third preset coefficient is greater than the first preset coefficient). This embodiment of this application imposes no limitation thereto.

Optionally, the free-wheeling diode control apparatus may alternatively perform the determining in another equivalent manner that is a variant of "determining whether the sum of the second pulse width value and the third pulse width value meets the second preset condition". For example, the free-wheeling diode control apparatus may alternatively obtain a second dead time of the power switching apparatus (where the second dead time of the power switching apparatus=the switching period of the power switching apparatus−the sum of the second pulse width value and the third pulse width value) according to the sum of the second pulse width value and the third pulse width value. Further, the free-wheeling diode control apparatus determines whether the second dead time of the power switching apparatus meets a fourth preset condition. Optionally, the fourth preset condition may include greater than or equal to a second preset dead time. Optionally, the second preset dead time may be the switching period of the power switching apparatus multiplied by a fourth preset coefficient (optionally, a sum of the third preset coefficient and the fourth preset coefficient is 1, and for example, the fourth preset coefficient may be 0.1). Certainly, if the third preset coefficient is another value, the fourth preset coefficient may be alternatively another value accordingly. This embodiment of this application imposes no limitation thereto. (1) If the second dead time of the power switching apparatus is greater than or equal to the second preset dead time, that is, the second dead time of the power switching apparatus meets the fourth preset condition, this is equivalent to that the sum of the second pulse width value and the third pulse width value meets the second preset condition. (2) If the second dead time of the power switching apparatus is less than the second preset dead time, that is, the second dead time of the power switching apparatus does not meet the fourth preset condition, this is equivalent to that the sum of the second pulse width value and the third pulse width value does not meet the second preset condition.

Optionally, the free-wheeling diode control apparatus may alternatively use another implementation to determine whether the sum of the second pulse width value and the third pulse width value meets the second preset condition. This embodiment of this application imposes no limitation thereto.

Further, (1) if the sum of the second pulse width value and the third pulse width value meets the second preset condition, conduction of the free-wheeling diode is controlled according to the second pulse width value. (2) If the sum of the second pulse width value and the third pulse width value does not meet the second preset condition, whether the quantity of times that the sum of the second pulse width value and the third pulse width value does not meet the second preset condition is less than the preset threshold (for example, 10) is determined, and (2a) if the quantity of times that the sum of the second pulse width value and the third pulse width value does not meet the second preset condition is less than the preset threshold, conduction of the free-wheeling diode is controlled according to the second pulse width value, or (2b) if the quantity of times that the sum of the second pulse width value and the third pulse width value does not meet the second preset condition is greater than or equal to the preset threshold, conduction of the free-wheeling diode is controlled according to the first pulse width value. Optionally, each time when determining that the sum of the second pulse width value and the third pulse width value does not meet the second preset condition, the free-wheeling diode control apparatus records the quantity of times that the sum of the second pulse width value and the third pulse width value does not meet the second preset condition, to facilitate subsequent determining.

Considering that the first pulse width value of the free-wheeling diode obtained according to the inductance current law is greater than the actual pulse width value of the free-wheeling diode when the power switching apparatus is in the CCM running scenario, the sum of the first pulse width value of the free-wheeling diode obtained according to the inductance current law and the third pulse width value may be greater than the switching period of the power switching apparatus. Therefore, an upper limit of the first pulse width value of the free-wheeling diode obtained according to the inductance current law needs to be clamped. Optionally, the controlling conduction of the free-wheeling diode according to the first pulse width value includes, if the first pulse width value is less than or equal to a preset pulse width value, controlling, according to the first pulse width value, a PWM generation apparatus in the power switching apparatus to generate a first PWM wave, where the first PWM wave is used to control the free-wheeling diode, and if the first pulse width value is greater than the preset pulse width value, controlling, according to the preset pulse width value, the PWM generation apparatus to generate a second PWM wave, where the second PWM wave is used to control the free-wheeling diode.

In this embodiment, if the first pulse width value is less than or equal to the preset pulse width value (optionally, the preset pulse width value=a difference between the switching period of the power switching apparatus and the third pulse width value), the free-wheeling diode control apparatus controls, according to the first pulse width value, the PWM generation apparatus in the power switching apparatus to generate the first PWM wave, where a pulse width value of the first PWM wave is equal to the first pulse width value, and the first PWM wave is used to control the free-wheeling diode.

Optionally, if the first pulse width value is greater than the preset pulse width value (optionally, the preset pulse width value=a difference between the switching period of the power switching apparatus and the third pulse width value), the PWM generation apparatus is controlled according to the preset pulse width value to generate the second PWM wave, where a pulse width value of the second PWM wave is equal to the preset pulse width value, and the second PWM wave is used to control the free-wheeling diode.

Optionally, the PWM generation apparatus outputs the generated PWM wave to the free-wheeling diode, to control conduction or disconnection of the free-wheeling diode.

Certainly, according to the first pulse width value, the free-wheeling diode control apparatus may alternatively use another implementation to control conduction of the free-wheeling diode. This embodiment of this application imposes no limitation thereto.

Optionally, the controlling conduction of the free-wheeling diode according to the second pulse width value includes controlling, according to the second pulse width value, the PWM generation module in the power switching apparatus to generate a third PWM wave, where the third PWM wave is used to control the free-wheeling diode.

In this embodiment, the free-wheeling diode control apparatus controls, according to the second pulse width value, the PWM generation module in the power switching apparatus to generate the third PWM wave, where a pulse width value of the third PWM wave is equal to the second pulse width value, and the third PWM wave is used to control the free-wheeling diode. Optionally, the PWM generation apparatus outputs the generated third PWM wave to the free-wheeling diode, to control conduction or disconnection of the free-wheeling diode.

Certainly, according to the second pulse width value, the free-wheeling diode control apparatus may alternatively use another implementation to control conduction of the free-wheeling diode. This embodiment of this application imposes no limitation thereto.

In this embodiment of this application, whether the sum of the first pulse width value of the free-wheeling diode in the power switching apparatus obtained according to the inductance current law and the third pulse width value of the main control tube in the power switching apparatus meets the first preset condition is determined, and the determining result is obtained. Further, to control conduction of the free-wheeling diode according to the first pulse width value or the second pulse width value of the free-wheeling diode obtained according to the volt-second balance law is determined according to the determining result such that the power switching apparatus controls conduction of the free-wheeling diode according to the first pulse width value in the CCM running scenario and/or the power switching apparatus controls conduction of the free-wheeling diode according to the second pulse width value in the DCM running scenario. It can be seen that, in the free-wheeling diode control method provided in this embodiment of this application, conduction of the free-wheeling diode may be controlled by flexibly using different pulse width values according to different running scenarios of the power switching apparatus such that energy in the power switching apparatus is always unidirectionally transmitted from an input end to an output end (that is, no negative inductance current appears in the power switching apparatus). In this way, reliability of a circuit system is ensured. In addition, the power switching apparatus controls conduction of the free-wheeling diode according to the second pulse width value (obtained according to the volt-second balance law) of the free-wheeling diode in the DCM running scenario. Compared with a pulse width value of the free-wheeling diode obtained in the other approaches according to a principle that a pulse width of the main control tube is complementary to a pulse width of the free-wheeling diode, the second pulse width value of the free-wheeling diode obtained according to the volt-second balance law in this embodiment is closer to the actual pulse width value of the free-wheeling diode such that control precision of the power switching apparatus in the DCM running scenario is further improved.

Figure 3:
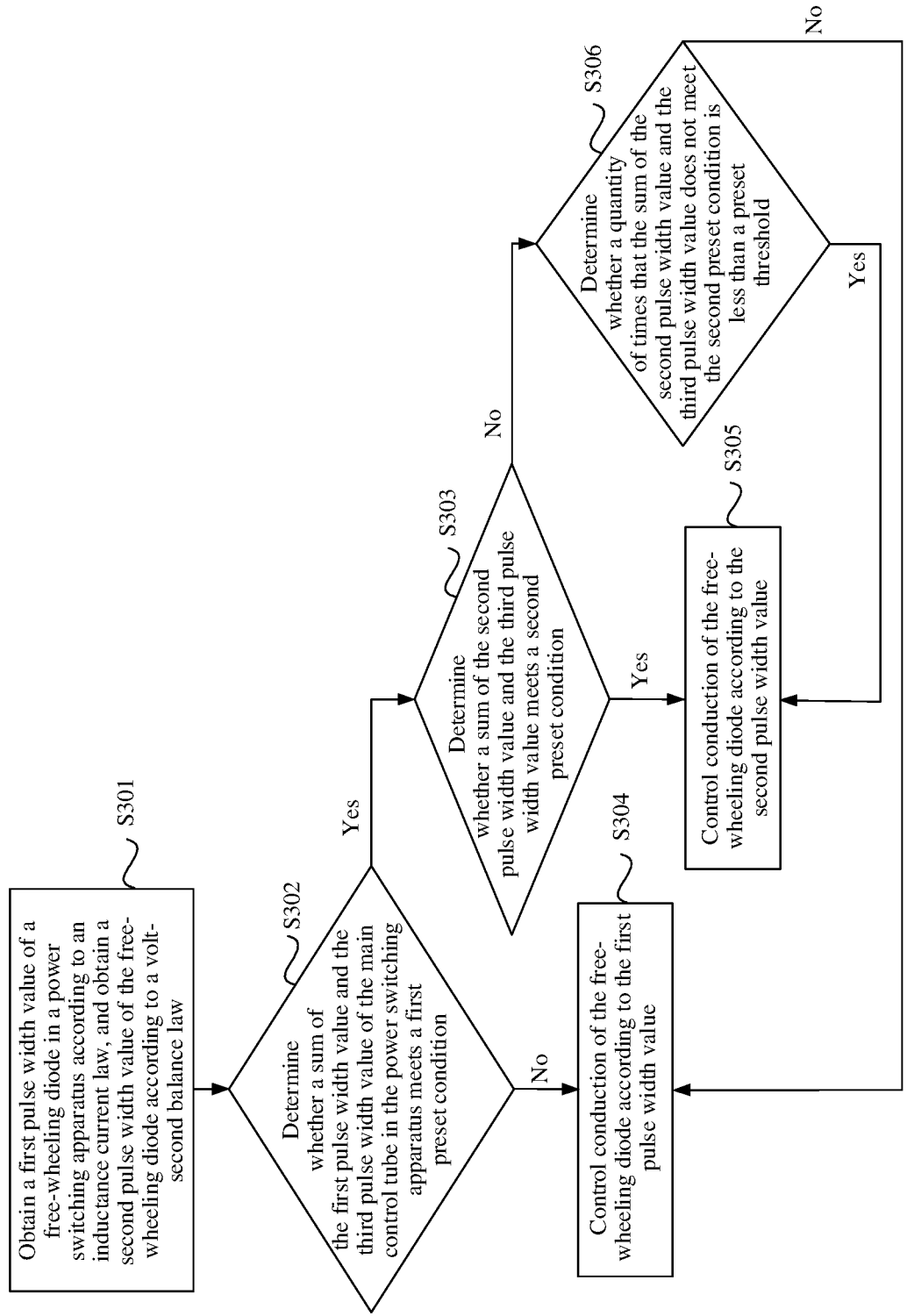
FIG. 3 is a schematic flowchart of a free-wheeling diode control method according to another embodiment of this application.

FIG. 3 is a schematic flowchart of a free-wheeling diode control method according to another embodiment of this application. Based on the foregoing embodiment, as shown in FIG. 3, the method in this embodiment of this application may include the following steps.

Step S301: Obtain a first pulse width value of a free-wheeling diode in a power switching apparatus according to an inductance current law, and obtain a second pulse width value of the free-wheeling diode according to a volt-second balance law.

In this embodiment, with reference to the foregoing embodiment, a process of obtaining the first pulse width value of the free-wheeling diode according to the inductance current law is described. Optionally, a specific process is as follows.

Step A1: Determine whether the power switching apparatus is in a buck mode. If the power switching apparatus is in the buck mode, perform step B1: Den=1/Von, and Ton=a third pulse width value of a main control tube when the power switching apparatus is in the buck mode. If the power switching apparatus is in a boost mode, perform step C1: Den=1/max(0.1 V, Vo−Vin), and Ton=a third pulse width value of the main control tube when the power switching apparatus is in the boost mode, where max( )represents a MAX function. After performing step B1 or step C1, further perform step D1: Temp=2*IL*Lv*Den, and Toff1=limit (Temp, 0, T−Ton−ΔTd), where limit( ) represents a clamping function (if Temp is greater than T−Ton−Td, T−Ton−Td is output, and if Temp is less than 0, 0 is output), T represents a switching period of the power switching apparatus, and ΔTd represents a sum of a falling edge dead time of the main control tube and a rising edge dead time of the main control tube in the power switching apparatus. Certainly, according to the inductance current law, the first pulse width value of the free-wheeling diode may be alternatively obtained in another equivalent process that is a variant of the foregoing process or another process. This embodiment of this application imposes no limitation thereto.

In this embodiment, with reference to the foregoing embodiment, a process of obtaining the second pulse width value of the free-wheeling diode according to the volt-second balance law is described. Optionally, a specific process is as follows.

Step A2: Determine whether the power switching apparatus is in the buck mode. If the power switching apparatus is in the buck mode, perform step B2: Temp=Temp−1, where Temp=Vin*Den, and Den=1/Von. After performing step B2, further perform step D2. If the power switching apparatus is in the boost mode, perform step C2: Temp=Vin*Den, where Den=1/max(0.1 V, Vo−Vin). After performing step C2, further perform step D2. Step D2: Toff2=Temp*Ton, and Toff2=limit(Temp, 0, T−Ton−ΔTd), where limit( ) represents the clamping function, T represents the switching period of the power switching apparatus, Ton represents a pulse width value of the main control tube in the power switching apparatus, and ΔTd represents the sum of the falling edge dead time of the main control tube and the rising edge dead time of the main control tube in the power switching apparatus. Certainly, according to the volt-second balance law, the second pulse width value of the free-wheeling diode may be alternatively obtained in another equivalent process that is a variant of the foregoing process or another process. This embodiment of this application imposes no limitation thereto.

Step S302: Determine whether a sum of the first pulse width value and the third pulse width value of the main control tube in the power switching apparatus meets a first preset condition.

In this embodiment, if the sum of the first pulse width value and the third pulse width value of the main control tube in the power switching apparatus meets the first preset condition, that is, the power switching apparatus is determined to be in a DCM running scenario, step S303 is to be performed, or if the sum of the first pulse width value and the third pulse width value of the main control tube in the power switching apparatus does not meet the first preset condition, that is, the power switching apparatus is determined to be in a non-DCM running scenario, step S304 is to be performed.

Step S303: Determine whether a sum of the second pulse width value and the third pulse width value meets a second preset condition.

In this embodiment, if the sum of the second pulse width value and the third pulse width value meets the second preset condition, step S305 is to be performed, or if the sum of the second pulse width value and the third pulse width value does not meet the second preset condition, step S306 is to be performed.

Step S304: Control conduction of the free-wheeling diode according to the first pulse width value.

Step S305: Control conduction of the free-wheeling diode according to the second pulse width value.

Step S306: Determine whether a quantity of times that the sum of the second pulse width value and the third pulse width value does not meet the second preset condition is less than a preset threshold.

In this embodiment, if the quantity of times that the sum of the second pulse width value and the third pulse width value does not meet the second preset condition is less than the preset threshold, step S305 is to be performed, or if the quantity of times that the sum of the second pulse width value and the third pulse width value does not meet the second preset condition is greater than or equal to the preset threshold, that is, the power switching apparatus is determined to be in the non-DCM running scenario, step S304 is to be performed.

In this embodiment, for an implementation of each of the foregoing steps, refer to related records in the foregoing embodiment of this application, and details are not described herein.

In this embodiment of this application, a free-wheeling diode control apparatus determines the running scenario of the power switching apparatus in a manner of determining whether the sum of the first pulse width value of the free-wheeling diode and the third pulse width value of the main control tube meets the first preset condition, determining whether the sum of the second pulse width value and the third pulse width value meets the second preset condition, and/or determining whether the quantity of times that the sum of the second pulse width value and the third pulse width value does not meet the second preset condition is less than the preset threshold. Further, conduction of the free-wheeling diode may be controlled by flexibly using different pulse width values according to different running scenarios of the power switching apparatus (for example, the power switching apparatus controls conduction of the free-wheeling diode according to the first pulse width value in a CCM running scenario, and/or the power switching apparatus controls conduction of the free-wheeling diode according to the second pulse width value in the DCM running scenario) such that energy in the power switching apparatus is always unidirectionally transmitted from an input end to an output end (that is, no negative inductance current appears in the power switching apparatus). In this way, reliability of a circuit system is ensured.

Optionally, in this embodiment of this application, the free-wheeling diode control apparatus performs the foregoing steps S301 to S306 once every preset time. Certainly, the free-wheeling diode control apparatus may alternatively perform the foregoing steps S301 to S306 in another manner. This embodiment of this application imposes no limitation thereto.

Figure 4:
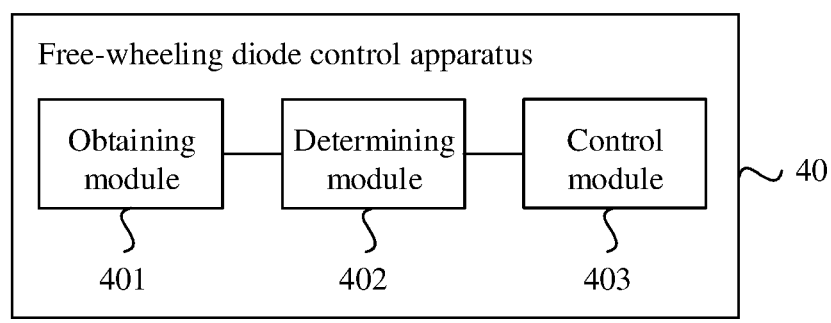
FIG. 4 is a schematic structural diagram of a free-wheeling diode control apparatus according to an embodiment of this application.

FIG. 4 is a schematic structural diagram of a free-wheeling diode control apparatus according to an embodiment of this application. As shown in FIG. 4, a free-wheeling diode control apparatus 40 provided in this embodiment may include an obtaining module 401, a determining module 402, and a control module 403.

The obtaining module 401 is configured to obtain a first pulse width value of a free-wheeling diode in a power switching apparatus according to an inductance current law, and obtain a second pulse width value of the free-wheeling diode according to a volt-second balance law.

The determining module 402 is configured to determine whether a sum of the first pulse width value and a third pulse width value of a main control tube in the power switching apparatus meets a first preset condition, and obtain a determining result.

The control module 403 is configured to determine, according to the determining result, to control conduction of the free-wheeling diode according to the first pulse width value or the second pulse width value.

Optionally, the control module 403 is further configured to, if the sum of the first pulse width value and the third pulse width value of the main control tube in the power switching apparatus meets the first preset condition, determine whether a sum of the second pulse width value and the third pulse width value meets a second preset condition, and if the sum of the second pulse width value and the third pulse width value meets the second preset condition, control conduction of the free-wheeling diode according to the second pulse width value, or if the sum of the second pulse width value and the third pulse width value does not meet the second preset condition, determine whether a quantity of times that the sum of the second pulse width value and the third pulse width value does not meet the second preset condition is less than a preset threshold, and if the quantity of times that the sum of the second pulse width value and the third pulse width value does not meet the second preset condition is less than the preset threshold, control conduction of the free-wheeling diode according to the second pulse width value.

Optionally, the control module 403 is further configured to, if the quantity of times that the sum of the second pulse width value and the third pulse width value does not meet the second preset condition is greater than or equal to the preset threshold, control conduction of the free-wheeling diode according to the first pulse width value.

Optionally, the control module 403 is further configured to, if the sum of the first pulse width value and the third pulse width value of the main control tube in the power switching apparatus does not meet the first preset condition, control conduction of the free-wheeling diode according to the first pulse width value.

Optionally, the control module 403 is further configured to, if the first pulse width value is less than or equal to a preset pulse width value, control, according to the first pulse width value, a PWM generation apparatus in the power switching apparatus to generate a first PWM wave, where the first PWM wave is used to control the free-wheeling diode.

Optionally, the control module 403 is further configured to, if the first pulse width value is greater than the preset pulse width value, control, according to the preset pulse width value, the PWM generation apparatus to generate a second PWM wave, where the second PWM wave is used to control the free-wheeling diode.

Optionally, the control module 403 is further configured to control, according to the second pulse width value, the PWM generation module in the power switching apparatus to generate a third PWM wave, where the third PWM wave is used to control the free-wheeling diode.

Optionally, the obtaining module 401 includes a first determining unit configured to determine the first pulse width value according to the inductance current law and based on an inductance value of an inductor in the power switching apparatus, a current of the inductor, and an output voltage of the power switching apparatus.

Optionally, the obtaining module 401 includes a second determining unit configured to determine the second pulse width value according to the volt-second balance law and based on an input voltage and the output voltage of the power switching apparatus and the third pulse width value of the main control tube.

The free-wheeling diode control apparatus in this embodiment may be configured to execute the technical solution provided in the foregoing embodiment of the corresponding free-wheeling diode control method in this application. Implementation principles and technical effects of the free-wheeling diode control apparatus are similar and are not described herein.

An embodiment of this application provides a power switching apparatus. The power switching apparatus includes the free-wheeling diode control apparatus provided in the foregoing embodiment of the free-wheeling diode control apparatus. Correspondingly, the power switching apparatus may execute the technical solution provided in the foregoing embodiment of the free-wheeling diode control method. Implementation principles and technical effects of the power switching apparatus are similar and are not described herein.

Figure 5:
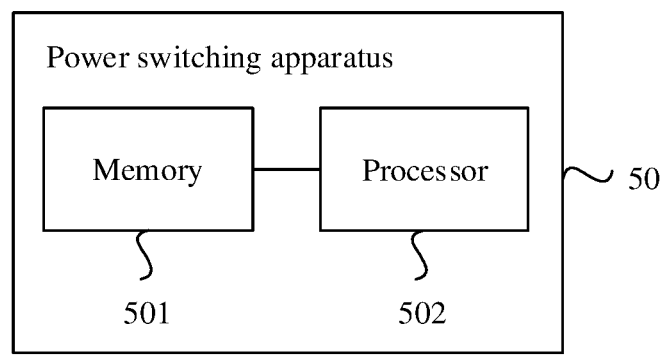
FIG. 5 is a schematic structural diagram of a power switching apparatus according to another embodiment of this application.

FIG. 5 is a schematic structural diagram of a power switching apparatus according to another embodiment of this application. As shown in FIG. 5, a power switching apparatus 50 provided in this embodiment may include a memory 501 and a processor 502.

The memory 501 is configured to store a program instruction. The processor 502 is configured to call the program instruction in the memory 501 to perform the following operations of obtaining a first pulse width value of a free-wheeling diode in a power switching apparatus according to an inductance current law, obtaining a second pulse width value of the free-wheeling diode according to a volt-second balance law, determining whether a sum of the first pulse width value and a third pulse width value of a main control tube in the power switching apparatus meets a first preset condition, and obtaining a determining result, and determining, according to the determining result, to control conduction of the free-wheeling diode according to the first pulse width value or the second pulse width value.

Optionally, the processor 502 is further configured to, if the sum of the first pulse width value and the third pulse width value of the main control tube in the power switching apparatus meets the first preset condition, determine whether a sum of the second pulse width value and the third pulse width value meets a second preset condition, and if the sum of the second pulse width value and the third pulse width value meets the second preset condition, control conduction of the free-wheeling diode according to the second pulse width value, or if the sum of the second pulse width value and the third pulse width value does not meet the second preset condition, determine whether a quantity of times that the sum of the second pulse width value and the third pulse width value does not meet the second preset condition is less than a preset threshold, and if the quantity of times that the sum of the second pulse width value and the third pulse width value does not meet the second preset condition is less than the preset threshold, control conduction of the free-wheeling diode according to the second pulse width value.

Optionally, the processor 502 is further configured to, if the quantity of times that the sum of the second pulse width value and the third pulse width value does not meet the second preset condition is greater than or equal to the preset threshold, control conduction of the free-wheeling diode according to the first pulse width value.

Optionally, the processor 502 is further configured to, if the sum of the first pulse width value and the third pulse width value of the main control tube in the power switching apparatus does not meet the first preset condition, control conduction of the free-wheeling diode according to the first pulse width value.

Optionally, the processor 502 is further configured to, if the first pulse width value is less than or equal to a preset pulse width value, control, according to the first pulse width value, a PWM generation apparatus in the power switching apparatus to generate a first PWM wave, where the first PWM wave is used to control the free-wheeling diode.

Optionally, the processor 502 is further configured to, if the first pulse width value is greater than the preset pulse width value, control, according to the preset pulse width value, the PWM generation apparatus to generate a second PWM wave, where the second PWM wave is used to control the free-wheeling diode.

Optionally, the processor 502 is further configured to control, according to the second pulse width value, the PWM generation module in the power switching apparatus to generate a third PWM wave, where the third PWM wave is used to control the free-wheeling diode.

Optionally, the processor 502 is further configured to determine the first pulse width value according to the inductance current law and based on an inductance value of an inductor in the power switching apparatus, a current of the inductor, and an output voltage of the power switching apparatus.

Optionally, the processor 502 is further configured to determine the second pulse width value according to the volt-second balance law and based on an input voltage and the output voltage of the power switching apparatus and the third pulse width value of the main control tube.

It may be understood that FIG. 5 only shows a simplified design of the power switching apparatus. Optionally, the power switching apparatus may further include a power apparatus, a detection apparatus (configured to detect parameters such as an inductance current and the input voltage and the output voltage of the power switching apparatus), and/or the like. All power switching apparatuses that can implement this application fall within the protection scope of this application.

The power switching apparatus in this embodiment may be configured to execute the technical solution provided in the foregoing embodiment of the corresponding free-wheeling diode control method in this application. Implementation principles and technical effects of the power switching apparatus are similar and are not described herein.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing apparatus, refer to a corresponding process in the foregoing method embodiments, and details are not described herein.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a digital versatile disc (DVD)), a semiconductor medium (for example, a solid state disk (SSD)), or the like.

What is claimed is:

1. A free-wheeling diode control method, comprising:
obtaining a first pulse width value of a free-wheeling diode in a power switching apparatus according to an inductance current law;
obtaining a second pulse width value of the free-wheeling diode according to a volt-second balance law;
obtaining a third pulse width value of a main control tube in the power switching apparatus;
making a determination whether a first sum of the first pulse width value and the third pulse width value meets a first preset condition; and
controlling, according to the determination, conduction of the free-wheeling diode according to the first pulse width value or the second pulse width value.

2. The free-wheeling diode control method of claim 1, further comprising:
determining whether a second sum of the second pulse width value and the third pulse width value meets a second preset condition when the first sum meets the first preset condition; and
controlling conduction of the free-wheeling diode according to the second pulse width value when the second sum meets the second preset condition.

3. The free-wheeling diode control method of claim 2, comprising:
identifying that a quantity of times that the second sum does not meet the second preset condition is greater than or equal to a preset threshold; and
controlling, in response to the identifying, conduction of the free-wheeling diode according to the first pulse width value.

4. The free-wheeling diode control method of claim 1, further comprising:
identifying that the first sum does not meet the first preset condition; and
controlling, in response to the identifying, conduction of the free-wheeling diode according to the first pulse width value.

5. The free-wheeling diode control method of claim 1, further comprising:
identifying that the first pulse width value is less than or equal to a preset pulse width value; and
controlling, in response to the identifying and according to the first pulse width value, a pulse width modulation (PWM) generation apparatus in the power switching apparatus to generate a first PWM wave, wherein the first PWM wave controls the free-wheeling diode.

6. The free-wheeling diode control method of claim 5, further comprising:
identifying that the first pulse width value is greater than the preset pulse width value; and
controlling, in response to the identifying and according to the preset pulse width value, the PWM generation apparatus to generate a second PWM wave, wherein the second PWM wave controls the free-wheeling diode.

7. The free-wheeling diode control method of claim 1, further comprising controlling, according to the second pulse width value, a pulse width modulation (PWM) generation apparatus in the power switching apparatus to generate a third PWM wave, wherein the third PWM wave controls the free-wheeling diode.

8. The free-wheeling diode control method of claim 1, further comprising determining the first pulse width value according to the inductance current law and based on an inductance value of an inductor in the power switching apparatus, a current of the inductor, and an output voltage of the power switching apparatus.

9. The free-wheeling diode control method of claim 1, further comprising determining the second pulse width value according to the volt-second balance law and based on an input voltage and an output voltage of the power switching apparatus and based on the third pulse width value.

10. The free-wheeling diode control method of claim 1, further comprising:
determining whether a second sum of the second pulse width value and the third pulse width value meets a second preset condition when the first sum meets the first preset condition;
determining whether a quantity of times that the second sum does not meet the second preset condition is less than a preset threshold; and
controlling conduction of the free-wheeling diode according to the second pulse width value when the quantity of times that the second sum does not meet the second preset condition is less than the preset threshold.

11. A power switching apparatus, comprising:
a free-wheeling diode;
a main control tube;
a memory configured to store program instructions; and
a processor coupled to the main control tube, the free-wheeling diode, and the memory, wherein the program instructions cause the processor to be configured to:
obtain a first pulse width value of the free-wheeling diode according to an inductance current law;
obtain a second pulse width value of the free-wheeling diode according to a volt-second balance law;
obtain a third pulse width value of the main control tube;
make a determination whether a first sum of the first pulse width value and the third pulse width value meets a first preset condition; and
control, according to the determination, conduction of the free-wheeling diode according to the first pulse width value or the second pulse width value.

12. The power switching apparatus of claim 11, wherein the program instructions further cause the processor is configured toto be configured to:
determine whether a second sum of the second pulse width value and the third pulse width value meets a second preset condition when the first sum meets the first preset condition; and
control conduction of the free-wheeling diode according to the second pulse width value when the second sum meets the second preset condition.

13. The power switching apparatus of claim 12, wherein the program instructions further cause the processor to be configured to:
identify that a quantity of times that the second sum does not meet the second preset condition is greater than or equal to a preset threshold; and
control, in response to the identifying, conduction of the free-wheeling diode according to the first pulse width value.

14. The power switching apparatus of claim 11, wherein the program instructions further cause the processor to be configured to:
identify that the first sum does not meet the first preset condition; and control, in response to the identifying, conduction of the free-wheeling diode according to the first pulse width value.

15. The power switching apparatus of claim 11, wherein the program instructions further cause the processor to be configured to:
   identify that the first pulse width value is less than or equal to a preset pulse width value; and
   control, in response to the identifying and according to the first pulse width value, a pulse width modulation (PWM) generation apparatus in the power switching apparatus to generate a first PWM wave, wherein the first PWM wave controls the free-wheeling diode.

16. The power switching apparatus of claim 15, wherein the program instructions further cause the processor to be configured to:
   identify that the first pulse width value is greater than the preset pulse width value; and
   control, in response to the identifying and according to the preset pulse width value, the PWM generation apparatus to generate a second PWM wave, wherein the second PWM wave controls the free-wheeling diode.

17. The power switching apparatus of claim 11, the wherein the program instructions further cause the processor to be configured to control, according to the second pulse width value, a pulse width modulation (PWM) generation apparatus in the power switching apparatus to generate a third PWM wave, and wherein the third PWM wave controls the free-wheeling diode.

18. The power switching apparatus of claim 11, wherein the program instructions further cause the processor to be configured to determine the first pulse width value according to the inductance current law and based on an inductance value of an inductor in the power switching apparatus, a current of the inductor, and an output voltage of the power switching apparatus.

19. The power switching apparatus of claim 11, wherein the program instructions further cause the processor to be configured to determine the second pulse width value according to the volt-second balance law and based on an input voltage and an output voltage of the power switching apparatus and based on the third pulse width value.

20. The power switching apparatus of claim 11, wherein the program instructions further cause the processor to be configured to:
   determine whether a second sum of the second pulse width value and the third pulse width value meets a second preset condition when the first sum meets the first preset condition;
   determine whether a quantity of times that the second sum does not meet the second preset condition is less than a preset threshold; and
   control conduction of the free-wheeling diode according to the second pulse width value when the quantity of times that the second sum does not meet the second preset condition is less than the preset threshold.

* * * * *

UNITED STATES PATENT AND TRADEMARK OFFICE
CERTIFICATE OF CORRECTION

Page 1 of 1

PATENT NO. : 10,917,014 B2
APPLICATION NO. : 16/805092
DATED : February 9, 2021
INVENTOR(S) : Chengfeng Jiang and Hongfeng Liang It is certified that error appears in the above-identified patent and that said Letters Patent is hereby corrected as shown below:

In the Claims

Claim 3, Column 25, Lines 29-30, should read:
"The free-wheeling diode control method of claim 2, further comprising:"

Claim 12, Column 26, Lines 44-46, should read:
"The power switching apparatus of claim 11, wherein the program instructions further cause the processor to be configured to:"

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*